United States Patent [19]

Kelly

[11] Patent Number: 4,776,129

[45] Date of Patent: Oct. 11, 1988

[54] BUTTERFLY NET

[75] Inventor: Michael B. Kelly, East Aurora, N.Y.

[73] Assignee: The Quaker Oats Company, Chicago, Ill.

[21] Appl. No.: 71,014

[22] Filed: Jul. 8, 1987

[51] Int. Cl.⁴ ............................................. A01M 5/00
[52] U.S. Cl. ................................................... 43/133
[58] Field of Search .................. 43/133, 134, 136, 10, 43/11, 12

[56] References Cited

U.S. PATENT DOCUMENTS

| | | | |
|---|---|---|---|
| 1,742,550 | 1/1930 | Mann | 43/12 |
| 1,921,596 | 8/1933 | Walter | 43/12 |
| 2,115,082 | 4/1938 | Phillips | 43/12 |
| 2,124,952 | 7/1938 | Norris et al. | 43/12 |
| 2,619,755 | 12/1952 | Henson | 43/12 |
| 2,874,506 | 2/1959 | Cliff | 43/11 |
| 3,760,523 | 9/1973 | Maxwell | 43/11 |
| 4,031,650 | 6/1977 | Popeil | 43/12 |
| 4,446,646 | 5/1984 | Van't Weld | 43/12 |

Primary Examiner—M. Jordan
Attorney, Agent, or Firm—Cumpston & Shaw

[57] ABSTRACT

A butterfly net is disclosed comprising a stocking cap-shaped netting open at one end thereof. The netting has a hem-line loop formed along the periphery of the open end. A flexible strip of finite length has one portion thereof threaded through the loop, and a second portion thereof extending outside the loop. The butterfly net is provided with an elongated handle member having a longitudinally extending opening. Guide means are provided adjacent the opening for guiding the second portion of the strip into the opening. An actuator is slidably mounted on the handle member, and is coupled to the second portion of the strip. The actuator is movable on the handle between a first position in which the one portion is of one length and the open end of the netting is fully opened, and a second position in which the one portion is of a smaller length and the open end of the netting is at least partially closed for capturing a butterfly.

5 Claims, 2 Drawing Sheets.

BUTTERFLY NET

FIELD OF THE INVENTION

The present invention relates generally to nets, and more specifically to a butterfly net in which the net is movable between open and at least partially closed positions.

BACKGROUND OF THE INVENTION

It is known in the art to provide a unitary net having a handle at one end and a closed loop at the other end about which a stocking cap-shaped netting is attached. However, a problem with such known nets is that the open end of the netting is always open, and it is difficult to retain a light flying object, such as a butterfly, within the net once it has been captured. Therefore, it is clear that a need exists in the art for a net in which the open end thereof is wide open for capturing a maneuverable object, such as a butterfly, and then can be quickly closed to prevent the butterfly from escaping. Accordingly, an object of the present invention is to provide a butterfly net that fulfills this need, and further is of simple design and construction for reliably and capably opening and closing the open end of the net.

SUMMARY OF THE INVENTION

An object of this invention is achieved by providing a butterfly net comprising:
- a stocking cap-shaped netting open at one end thereof;
- a loop formed along the periphery of the open end;
- a flexible strip of finite length having a first portion thereof threaded through the loop and a second portion thereof extending outside the loop;
- an elongated handle member having a longitudinally extending opening;
- guide means for guiding the second portion of the flexible strip into the opening; and
- means on the handle member coupled to the second portion and movable between a first position in which the second portion extends a short distance into the opening and the first portion is one length causing the open end of the netting to be fully open, and a second position in which the second portion extends a greater distance into the opening and the first portion is of a smaller length than the one length causing the open end of the netting to be at least partially closed for capturing a butterfly.

A further object of the present invention is accomplished by providing the wall of the handle member with an elongated slot extending therethrough. Means for opening and closing the net comprises a cylindrical actuator slidably mounted on the handle member of the net. The actuator has a projection extending through the slot into the opening, and further has a nose portion connected to the second portion of the strip which is movable within the opening.

BRIEF DESCRIPTION OF THE DRAWINGS

In the detailed description of the invention presented below, reference is made to the accompanying drawings, in which.

DETAILED DESCRIPTION OF THE INVENTION

Figure 1:
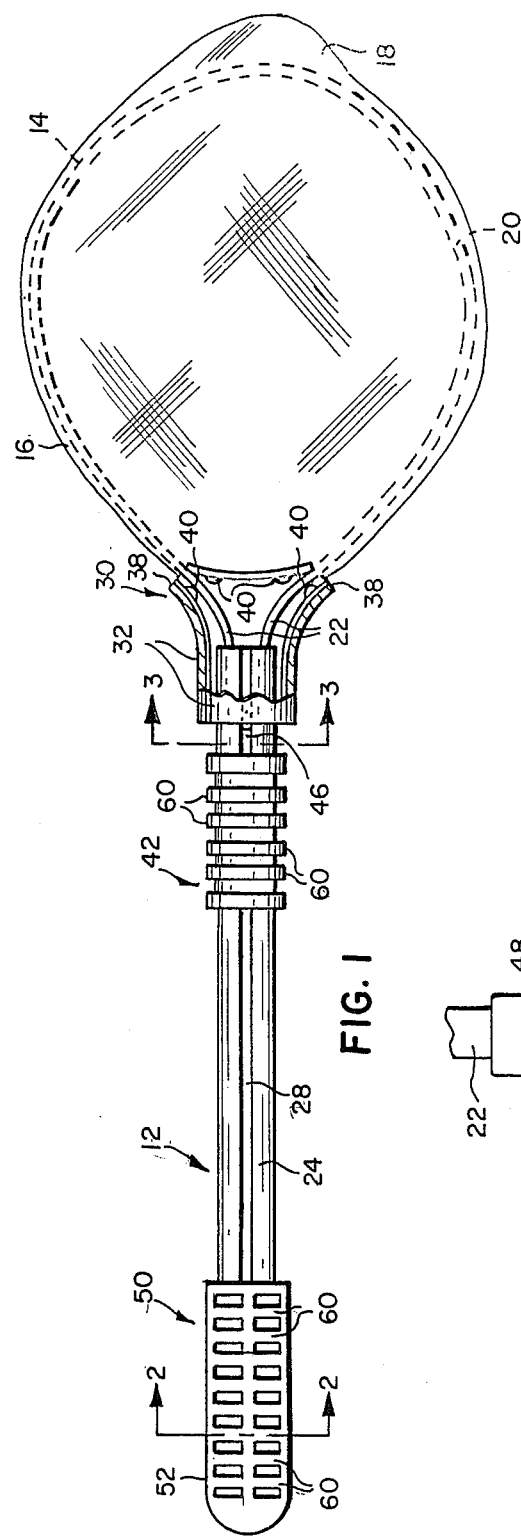
FIG. 1 is a top plan view of a preferred embodiment of a butterfly net in accordance with the present invention.

With reference to FIGS. 1-5, a preferred embodiment of a butterfly net 10 of this invention is disclosed. The butterfly net 10 comprises a handle member 12 at one end and a flexible strip 14 in the form of a hoop at the other end. The flexible strip 14 is preferably formed from a plastic material and is threaded through a hemline loop 16 formed along the periphery of the open end of a stocking cap-shaped netting 18. A first hoop-like portion 20 of flexible strip 14 supports the looped netting 18, and a second outer end portion 22 of the strip extends outside the looped netting.

The handle means 12 comprises a cylindrical handle memer having a central opening 26 extending therethrough. The handle member 24 further has an elongated slot 28 extending through the wall of the handle member.

Figure 3:
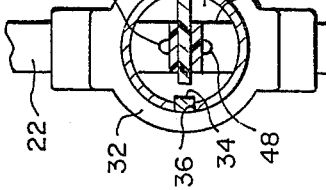
FIG. 3 is a section view taken substantially along line 3—3 of FIG. 1.

The handle means is provided with a guide means 30 at the entry end of handle member 12 for guiding the second end portion 22 of strip 14 extending outside the loop into center opening 26 in handle member 12. The guide means 30 comprises a pair of channel-shaped members 32 having mating semi-cylindrical ends which encircle the handle member. At least one of the members 32 is secured to handle member 12 by one or more posts 34 extending radially into complementary openings 36 in the handle member, as best seen in FIG. 3. The channel-shaped members 32 further have a pair of mating shoulder portions 38 having inner arcuate guide surfaces 40 (FIG. 1) forming passageways for the second end portion 22 of flexible strip 14.

Figure 4:
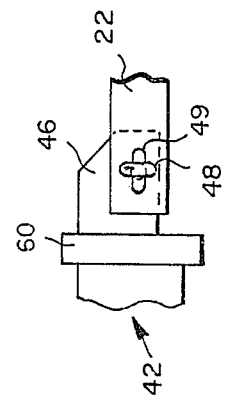
FIG. 4 is a segmental side elevational view showing the coupling between the actuator and the second portion of the strip extending outside of the netting.

A manually operated cylindrical actuator 42 is slidably mounted on the handle member 12, and has a fin 44 (FIG. 3) radially extending through elongated slot 28 into the central opening 26 of the handle member. The fin 44 has a nose portion 46 having laterally extending T-shaped lugs 48 extending through elongated openings 49 in each strip end for securing the strip to the actuator member, as best seen in FIG. 4. Accordingly, with actuator 42 in the position shown in FIG. 1, the first portion 20 of flexible strip 14 is of one length and is ballooned outwardly so that the open end of netting 18 is fully open. When actuator 42 is slid outwardly to the position shown in FIG. 5, the second end portion 22 of strip 14 extends further into handle 12, causing first portion 20 of the strip to be of a length shorter than the one length to at least partially close the open end of the net.

Although second end portion 22 of strip 14 is shown as two strip ends secured to nose portion 46, it should be understood that the strip ends could be connected to form a continuous strip passing through a hook on the nose portion.

Figure 2:
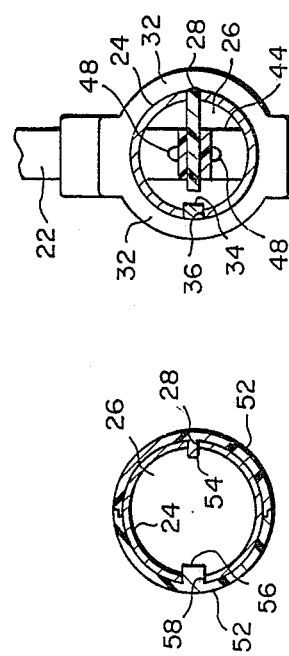
FIG. 2 is a section view taken substantially along line 2—2 of FIG. 1.
Figure 5:
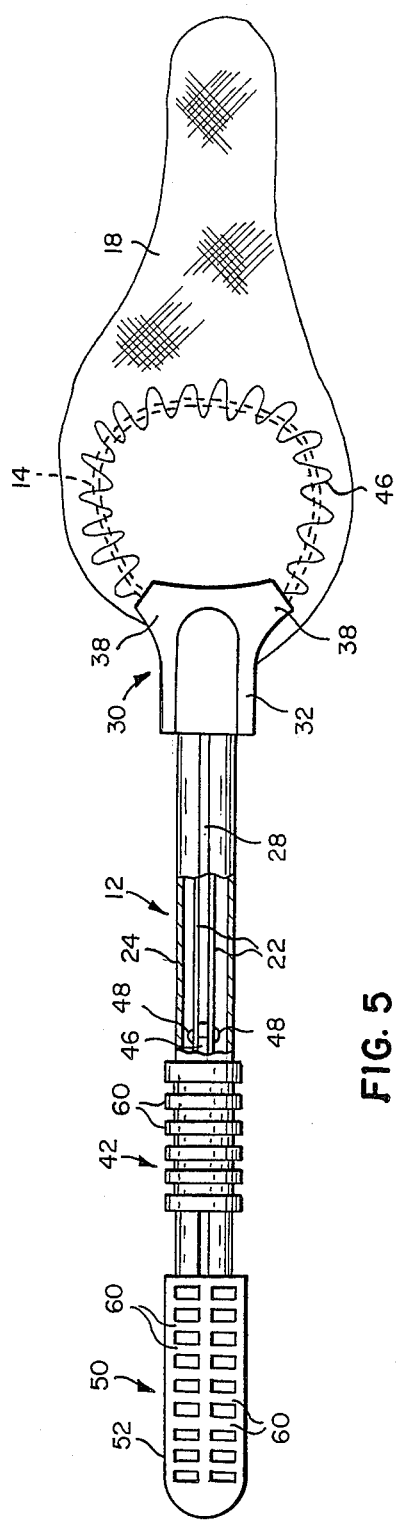
FIG. 5 is a top plan view similar to FIG. 1 with a portion thereof broken away and sectioned, and further showing the butterfly net in its partially closed position.

A handle grip 50 is provided at the opposite end of the handle member comprising a pair of semi-cylindrical members 52 closed off at one end thereof. One of the semi-cylindrical members 52 has a fin 54 that radially extends into longitudinal slot 28 of handle member 12, and the mating semi-cylindrical member 52 has a plurality of posts 56 radially extending into openings 58 in the handle member, as best seen in FIG. 2. both handle grip 50 and actuator 42 are provided with ribs 60 to facilitate gripping them, While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A butterfly net comprising:
   a stocking cap-shaped netting open at one end thereof;
   a loop formed along the periphery of the open end;
   a flexible strip of finite length having a first portion thereof threaded through the loop and a second portion thereof extending outside the loop;
   an elongated handle member having a longitudinally extending opening, a cylindrical wall and an elongated slot extending through the wall;
   guide means mounted on one end of the handle member and comprising shoulders defining a pair of space-restricted passageways through which the second portion of the strip is guided into the opening; and
   a cylindrical actuator slidably movable on the handle member and having a projection on the actuator extending through the slot and into the opening, the projection having a nose portion within the opening which is connected to the second portion of the strip and movable between a first position in which the second portion extends a short distance into the opening and the first portion is of one length causing the open end of the netting to be fully open, and a second position in which the second portion extends a greater distance into the opening and the first portion is of a length shorter than the one length causing the open end of the netting to be at least partially closed for capturing a butterfly.

2. A butterfly net according to claim 1 wherein the nose portion has a pair of oppositely directed laterally extending lugs, and the second portion comprises a pair of strip ends connected to the pair of lugs.

3. A butterfly net according to claim 2 wherein the lugs are T-shaped, and each strip end has an elongated opening for receiving a T-shaped lug.

4. Apparatus for capturing insects comprising:
   a handle comprising a cylindrical wall and an elongated slot extending through the wall;
   a loop of flexible material projecting outwardly from one end of said handle;
   a net having an open peripheral end comprising a hemline loop slidably mounted on said loop of flexible material with a first portion threaded though said hemline loop and a second portion extending outside the hemline loop;
   guide means mounted on one end of the handle and comprising shoulders defining a pair of space-restricted passageways through which the second portion of the strip is guided;
   a cylindrical actuator slidably movable on the handle member and having a projection on the actuator extending through the slot and into one of the passageways, the projection having a nose portion within the passageway, said actuator movable between a first position in which the second portion extends a short distance into the opening and the first portion is of one length causing the peripheral end of the net to be fully open, and a second position in which the second portion extends a greater distance into the opening and the first portion is of a length shorter than the one length causing the peripheral end of the net to be at least partially closed for capturing an insect, such nose portion having a pair of oppositely directed laterally extending lugs, and the second portion comprises a pair of strip ends connected to the pair of lugs.

5. The apparatus of claim 4 wherein the lugs are T-shaped, and each strip end has an elongated opening for receiving a T-shaped lug.

* * * * *